(12) United States Patent
Korte et al.

(10) Patent No.: US 12,441,549 B2
(45) Date of Patent: Oct. 14, 2025

(54) CONVEYING APPARATUS FOR A PACKAGING MACHINE, TRANSPORT APPARATUS FOR TRANSPORTING PRODUCTS AND A PACKAGING MACHINE

(71) Applicant: ILLINOIS TOOL WORKS INC., Glenview, IL (US)

(72) Inventors: Hartmut Korte, Bramsche (DE); Linus Wöhle, Schapen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 124 days.

(21) Appl. No.: 18/019,019

(22) PCT Filed: Aug. 4, 2021

(86) PCT No.: PCT/US2021/044483
§ 371 (c)(1),
(2) Date: Jan. 31, 2023

(87) PCT Pub. No.: WO2022/035655
PCT Pub. Date: Feb. 17, 2022

(65) Prior Publication Data
US 2024/0043218 A1 Feb. 8, 2024

(30) Foreign Application Priority Data

Aug. 4, 2020 (EP) ..................... 20189305

(51) Int. Cl.
*B65G 17/08* (2006.01)
*B65B 35/04* (2006.01)
(Continued)

(52) U.S. Cl.
CPC .............. *B65G 17/08* (2013.01); *B65B 35/04* (2013.01); *B65B 35/243* (2013.01); *B65G 17/46* (2013.01); *B65B 2210/02* (2013.01)

(58) Field of Classification Search
None
See application file for complete search history.

(56) References Cited

U.S. PATENT DOCUMENTS 4,064,987 A * 12/1977 Rowan ................. B65G 37/005
198/604
4,124,203 A * 11/1978 Muller ..................... B65H 5/30
270/52.2
(Continued)

FOREIGN PATENT DOCUMENTS

DE  35 15 754 A1  11/1986
DE  3 321 018 C2  6/1989
(Continued)

OTHER PUBLICATIONS

EPO (Riswijk, NL), English language version of the International Search Report, Form PCT/ISA/210, for International Application PCT/US2021/044483, Nov. 2, 2021 (3 pages).
(Continued)

*Primary Examiner* — Kavel Singh
(74) *Attorney, Agent, or Firm* — Pauley Erickson & Swanson

(57) ABSTRACT

A conveying apparatus in or for a packaging machine having at least one conveyor chain (1) which circulates in a chain running direction (5) and includes a large number of chain links (3) that are connected to one another in an articulated manner around a respective chain link axis (4) via transversely extending chain pins (2). Lamellar elements (6) that include lamellae (7) made of an elastic material, in particular a spring-elastic material, are oriented obliquely with respect to the chain running direction (5) are placed on the chain links (3), in particular interchangeably.

20 Claims, 6 Drawing Sheets

(51) Int. Cl.
   *B65B 35/24* (2006.01)
   *B65G 17/46* (2006.01)

(56) References Cited

U.S. PATENT DOCUMENTS

| | | | | |
|---|---|---|---|---|
| 5,090,557 | A * | 2/1992 | Carmen | B65G 15/14 |
| | | | | 198/626.1 |
| 5,094,340 | A * | 3/1992 | Avakov | E21B 19/22 |
| | | | | 226/173 |
| 5,492,216 | A * | 2/1996 | McCoy | B65G 15/14 |
| | | | | 198/833 |
| 6,533,104 | B1 * | 3/2003 | Starlinger-Huemer | |
| | | | | B65H 5/14 |
| | | | | 198/606 |
| 6,695,135 | B1 | 2/2004 | Lapeyre | |
| 6,786,326 | B2 * | 9/2004 | Hiramoto | B65G 37/005 |
| | | | | 198/836.2 |
| 7,686,159 | B2 * | 3/2010 | Elsner | B65G 17/40 |
| | | | | 198/853 |
| 7,731,020 | B2 * | 6/2010 | Bigler | B65G 17/32 |
| | | | | 198/850 |
| 7,857,042 | B2 * | 12/2010 | Koopmans | E21B 19/22 |
| | | | | 166/77.3 |
| 9,272,849 | B2 * | 3/2016 | Lukes | B65B 35/58 |
| 9,309,055 | B2 * | 4/2016 | Pedretti | B65B 61/28 |
| 9,540,177 | B1 * | 1/2017 | Yasinski | B65G 17/08 |
| 9,849,491 | B2 * | 12/2017 | Della Rossa | B21C 1/30 |
| 10,829,318 | B2 * | 11/2020 | Kreft | A47F 7/0014 |

FOREIGN PATENT DOCUMENTS

| | | | |
|---|---|---|---|
| EP | 0 175 483 A1 | 3/1986 | |
| EP | 0 369 955 A1 | 5/1990 | |
| EP | 1 477 434 A1 | 11/2004 | |
| EP | 2 112 097 A1 | 10/2009 | |
| EP | 3706588 B1 * | 1/2022 | A24C 5/35 |
| FR | 2 108 942 A1 | 5/1972 | |
| WO | WO 2008/067684 A1 | 6/2008 | |
| WO | WO 2014/196862 A1 | 12/2014 | |
| WO | WO 2015/042624 A1 | 4/2015 | |
| WO | WO 2016/080826 A1 | 5/2016 | |

OTHER PUBLICATIONS

EPO (Riswijk, NL), English the Written Opinion of the Int'l Searching Authority, Form PCT/ISA/237, for Int'l Application PCT/US2021/044483, Nov. 2, 2021 (7 pages).

* cited by examiner

CONVEYING APPARATUS FOR A PACKAGING MACHINE, TRANSPORT APPARATUS FOR TRANSPORTING PRODUCTS AND A PACKAGING MACHINE

CROSS REFERENCE TO RELATED APPLICATION

This application is National Phase filing in the United States, under 35 USC § 371, of PCT International Patent Application PCT/US2021/044483, filed on 4 Aug. 2021, which claims the priority of European Patent Applications EP 20189305.4, filed 4 Aug. 2020.

These applications are hereby incorporated by reference herein in their entirety and is made a part hereof, including but not limited to those portions which specifically appear hereinafter.

BACKGROUND OF THE INVENTION

Field of the Invention

The present invention relates generally to packaging installations and in particular to transport and conveying apparatuses, in particular for transporting products in packaging lines of a packaging installation.

Discussion of Related Art

Packaging lines of the type considered here typically comprise different packaging units or packaging machines which, for example, further process already filled packs (generally also referred to here as "products"), for example by consolidating the filled packs/products into units or, for example, providing them with straw, labels, or the like.

Since the individual packaging machines are typically disposed sequentially one behind the other within a packaging line, the products to be processed have to be delivered to and removed from the individual packaging machines with the aid of suitable transport apparatuses.

In particular in the case of products that are pressure-sensitive, special precautions have to be taken when transporting the products, in particular within the packaging line.

For transporting such products, the use of conveying apparatuses having at least one conveyor chain which circulates in a chain running direction is well-known. As a rule, the conveyor chain comprises a large number of chain links that are connected to one another in an articulated manner via transversely extending chain pins.

Fitting so-called "support caps," which form a substantially continuous bearing surface, on the chain links is well-known too. The support caps often have a substantially U-shaped cross-section and can be held in an articulated manner on a respective chain pin.

To transport folding boxes or other packs into which a product is to be placed within a packaging machine, for example, the use of conveyor chains that circulate in one plane and carry receptacles for the packs is commonplace. Since the formation of a large number of receptacles is structurally complex, attempts have been made to place the packs directly on the conveyor chain, which for this purpose comprises a large number of support caps covering it in order to create a continuous bearing surface.

Mounting a support cap in an articulated manner on each of the chain pins that connect the individual chain links of the conveyor chain to one another in an articulated manner, which support cap has a convex section facing in conveying direction on its front end and a complementary concave section on its opposite rear end, so that the conveyor chain with the fitted support caps can follow a deflection on the sprockets is known from Document DE 3 321 018 C2, for example. The conveyor chain is guided by lateral guide walls along which the support caps extend, and by a lower running surface, on which the support caps rest loosely and over which they slide.

However, the configuration of the guide walls and the running surface is structurally very complex. The support caps are moreover not prevented from lifting off the running surface, which can lead to unsteady running of the conveyor chain and a bumpy and uneven transport of the pack disposed on the bearing surface of the conveyor chain. This is further exacerbated by the fact that the support caps, each of which is associated with one chain pin, can be subject to relative movement due to the existing play in the chain.

Circulating conveyor chains for forming a buffer table are furthermore known from Documents WO 2014/196862 A1 and WO 2016/080826 A1 (both of Polyketting Holding B.V.).

SUMMARY OF THE INVENTION

The conveying apparatuses described above and known from the state of the art are in particular not suitable for an especially "gentle" transport of products, such as in particular pressure-sensitive products.

Therefore, the underlying object of the present invention is to specify a conveying apparatus in a or for a packaging machine having at least one conveyor chain which circulates in a chain running direction, whereby in particular even pressure-sensitive products can be transported safely with the conveying apparatus.

This object is achieved according to the invention by the subject matters of the independent claims, whereby advantageous further developments of the conveying apparatus according to the invention are specified in the dependent claims.

The claimed subject matter further relates to a buffer table for a packaging installation, wherein the buffer line of the buffer table is formed by two parallel conveyor chains of the type according to the invention.

The invention is further achieved by a transport apparatus for transporting products, in particular pressure-sensitive products, in a transport direction.

The invention therefore relates in particular to a conveying apparatus in a or for a packaging machine, whereby the conveying apparatus has at least one conveyor chain which circulates in a chain running direction and comprises a large number of chain links that are connected to one another in an articulated manner around a respective chain link axis via transversely extending chain pins.

In order to be able to ensure a particularly "gentle" transport of products, according to the invention it is in particular provided that lamellar elements comprising lamellae made of an elastic material, in particular a spring-elastic material, such as a rubber material, which are oriented obliquely with respect to the chain running direction are placed on the chain links, in particular interchangeably.

Alternatively, it is conceivable that lamellar elements comprising a base that rests on the chain links and lamellae that are connected to the base via an elastic region and in particular a spring-elastic region are placed on the chain links, in particular interchangeably, wherein the lamellae are oriented obliquely with respect to the chain running direction.

Providing corresponding lamellae made of an in particular spring-elastic material, or providing lamellae which are in particular mounted in a spring-elastic manner and which are oriented obliquely with respect to the chain running direction, advantageously allows the products to not immediately be subjected to the full edge pressure of the chain links of the conveyor chain or the individual lamellae when they enter the conveyor chain and consequently accelerated in a jerky manner. As a result of the oblique orientation of the lamellae with respect to the chain running direction, according to the invention the edges of the lamellae instead rest continuously against the product, which ultimately makes a "more gentle" change in speed (acceleration) possible.

Likewise, in the event of hold-ups, the products are slowed down "more gently" as well.

The conveying apparatus according to the invention consequently enables especially gentle transport of in particular pressure-sensitive products or packs in a packaging line.

According to preferred implementations of the conveying apparatus according to the invention, it is provided that the lamellae are oriented counter to the chain running direction and are inclined with respect to the chain running direction, in particular by approximately 100 degrees to 140 degrees, and preferably in particular by approximately 110 degrees to 130 degrees. These angle ranges for the (oblique) orientation of the lamellae have been found to be particularly effective in practical use with respect to the time-delayed application of the edge pressure of the individual lamellae to the products.

The invention is not limited to these angle ranges.

The advantageous effect of gentle transport of products that can be achieved with the conveying apparatus according to the invention can be further optimized by placing the lamellae obliquely on the chain links such that the lamellae are oriented obliquely with respect to the chain link axis and obliquely with respect to the chain running direction. This arrangement makes it possible to achieve a further time delay when products enter the conveyor chain until the products are subjected to the full edge pressure of the individual lamellae.

With respect to the oblique placement of the lamellar elements on the chain links, it has been shown to be particularly effective when the lamellar elements are placed obliquely on the chain links such that an angle of in particular approximately 1 degree to approximately 5 degrees and preferably an angle of in particular approximately 1.5 degrees to approximately 4 degrees is defined between the lamellae and the chain link axis.

These angle specifications, too, are not to be regarded as limiting, and depend in particular also on the circulating speed of the conveyor chain and the products to be transported with the conveyor chain.

It is generally advantageous for the chain links to be oriented vertically, wherein the lamellar elements are placed obliquely on the chain links such that the lamellae are oriented obliquely with respect to the chain link axis, specifically such that, when viewed in chain running direction, a lower region of each lamella precedes its upper region.

In other words, from the point of view of a single lamellae, the lower region of this lamellae consequently comes into contact with the product to be transported, in terms of time, before the upper region of the corresponding lamellae. This has advantages in terms of the stability of the products to be transported by the conveying apparatus, because, due to gravity, the lower region of each product reacts less sensitively than the corresponding upper region of the product when a transport force is applied.

According to implementations of the conveying apparatus according to the invention, it is provided that, when viewed in longitudinal direction of the lamellar elements, the lamellae are configured to be shorter than the chain width specifically such that, when viewed perpendicular to the chain running direction, the lateral edge regions of the chain links connected to one another in an articulated manner form two opposite, edge-side conveyor chain regions that serve as a guide, in particular for implementing a deflection of the circulating conveyor chain over the inner radius.

With this configuration, therefore, the guidance and deflection of the conveyor chain is not affected despite the provision of the lamellar elements.

The chain links of the conveyor chain preferably each comprise a base body, in particular made of plastic, having a respective toothing on two opposite edge regions, wherein said toothings are offset relative to one another and configured such that a complementary toothing of an adjacent chain link can respectively be accommodated in an articulated manner.

This is a particularly easy-to-implement, yet effective configuration of the chain links. The individual chain links, in particular, can be produced inexpensively, for example with the aid of an injection molding process. Of course, other configurations for the chain links are possible as well.

With respect to the lamellar elements, it is advisable for the lamellar elements to each be configured as a one-piece body, preferably made of a rubber material. The lamellar elements or the body of the lamellar elements can in particular be formed as part of an injection molding process.

According to implementations of the present invention, the body of the lamellar element is substantially U-shaped in cross-section, specifically with a base region, via which the lamellar element rests on the chain link, and with two at least substantially parallel leg regions, which form the lamellae of the lamellar element and extend obliquely with respect to the base region.

Other configurations for the lamellar elements are conceivable here as well.

The lamellar element is preferably connected to the chain link, in particular in a detachable and/or interchangeable manner, via a form- and/or force-locking connection. For this purpose, it is advisable to use a suitable screw and/or latching and/or clip connection.

It is also generally conceivable to connect the lamellar element to the chain link in a material-locking manner, for example by adhesive bonding. In that case, however, interchanging the lamellar element is no longer possible, or is correspondingly more complex.

As already indicated, the solution according to the invention is in particular characterized in that the lamellar elements, and in particular the lamellae of the lamellar elements, are configured and/or placed on the corresponding chain links such that products are subjected to the edge pressure of the individual lamellae in a time-delayed manner when they enter the conveyor chain. This makes it possible to achieve the desired "gentle" transport of the products.

It is particularly preferably provided that the orientation of the lamellae relative to the chain running direction and/or relative to the chain link axis is preferably variably adjustable, at least over a previously defined or definable range, in order to be able to optimally adapt the conveyor chain to the respective application. The optimum inclination of the lamellae relative to the chain running direction and/or relative to the chain link axis is in particular dependent on the transport speed of the conveying apparatus and possibly the configuration of the products to be transported.

The invention further relates to a transport apparatus for transporting products, in particular pressure-sensitive products, in a transport direction. The transport apparatus comprises a first conveying apparatus of the aforementioned type according to the invention and a second conveying apparatus of the aforementioned type according to the invention.

In the transport apparatus according to the invention it is in particular provided that the conveyor chain of the first conveying apparatus and the conveyor chain of the second conveying apparatus are each disposed at least substantially vertically and extend at least substantially parallel in a transport region of the transport apparatus.

Even though providing the lamellar elements already enables a particularly gentle transport of the products in the transport region of the transport apparatus, it is preferred that, when viewed in transport direction of the transport apparatus, an infeed area is configured upstream of the transport region, in which infeed area the conveyor chain of the first conveying apparatus and the conveyor chain of the second conveying apparatus extend obliquely with respect to the transport direction in the direction of the transport region and thus form a preferably conically tapering infeed funnel. Providing such an infeed funnel makes it possible to implement the infeed, i.e., the transfer, of the products to be transported to the transport region of the transport apparatus in a particularly gentle manner.

Alternatively or additionally, it is conceivable that, when viewed in transport direction of the transport apparatus, an outfeed area is configured downstream of the transport region, in which outfeed area the conveyor chain of the first conveying apparatus and the conveyor chain of the second conveying apparatus respectively extend outward obliquely with respect to the transport direction and thus form a preferably conically widening outfeed funnel. Providing such an outfeed funnel enables a particularly gentle transfer of the products from the transport region of the transport apparatus, for example to a packaging machine disposed downstream.

The aforementioned advantages achieved with the conveying apparatus according to the invention come into play in particular when the conveying apparatus is used with buffer tables.

The patent application accordingly further relates to a buffer table for a packaging installation, wherein the buffer table comprises at least one infeed section, at least one outfeed section, and at least one buffer line which can be loaded with packs and is disposed between the at least one infeed section and the at least one outfeed section. To transport the respective packs, the at least one buffer line is associated with a transport apparatus, wherein the transport apparatus comprises a first conveying apparatus of the above-described type according to the invention and a second conveying apparatus of the above-described type according to the invention.

The conveyor chain of the first conveying apparatus and the conveyor chain of the second conveying apparatus are each disposed at least substantially vertically and extend at least substantially parallel to one another at least in one region of the at least one buffer line.

It is hereby in particular provided that, at least in the region of the at least one buffer line, the lamellae of the conveyor chain of the first conveying apparatus and the lamellae of the conveyor chain of the second conveying apparatus are respectively oriented obliquely with respect to the chain running direction, specifically such that, when viewed in chain running direction, a lower region of each lamellae precedes its upper region.

This arrangement makes it possible to achieve a self-reinforced clamping effect produced by the lamellae. The special inclined position of the lamellae allows a clamping force exerted on the products by the lamellae of the two conveyor chains to be increased as a function of a force which acts in chain running direction and relatively between the lamellae and the products. The lamellae are thus used to counteract an increasing product backlog, while the increasing backlog conversely causes the lamellae to stand more upright.

The buffer table according to the invention is in particular a buffer table in which packs are or can be stored temporarily without pressure, i.e., with a previously defined or definable (small) spacing between one another.

Lastly, the invention also relates to a packaging machine having at least one and preferably at least two packaging installations and a transport apparatus of the aforementioned type according to the invention, wherein the transport apparatus is used to deliver and/or remove products to and/or from the at least one packaging installation.

BRIEF DESCRIPTION OF SEVERAL VIEWS OF THE DRAWINGS

The invention is described in more detail in the following on the basis of example embodiments with reference to the accompanying drawings.

DETAILED DESCRIPTION OF THE INVENTION

Figure 1:
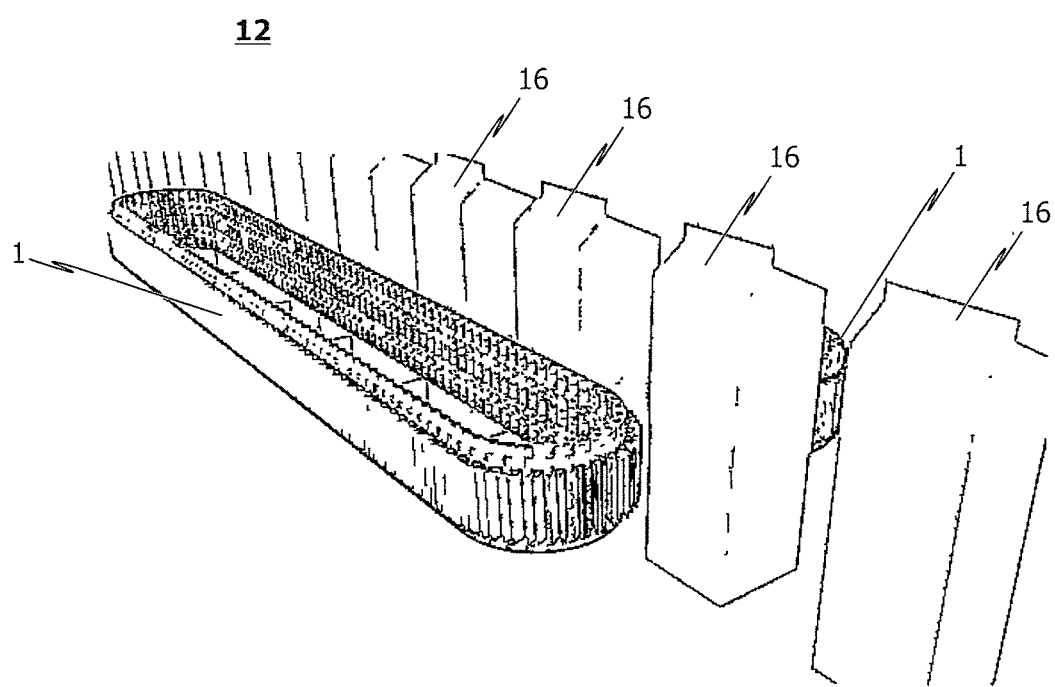
FIG. 1 shows, schematically and in an isometric view, an example embodiment of the transport apparatus according to the invention comprising two parallel disposed conveyor chains for transporting drink packs.

FIG. 1 shows an example embodiment of the transport apparatus 12 according to the invention schematically and in an isometric view. The transport apparatus 12 is used to transport products 16 (here: drink packs) in a transport direction. For this purpose, two at least partly parallel disposed conveyor chains 1 are used, between which a transport region 13 (see FIG. 8) of the transport apparatus 12 is formed.

The conveyor chains 1 used in the transport apparatus 12 according to FIG. 1 are described in more detail in the following with reference to the illustrations in FIG. 2 to FIG. 7. These are in particular conveyor chains 1 that ensure particularly gentle product transport.

Figure 2:
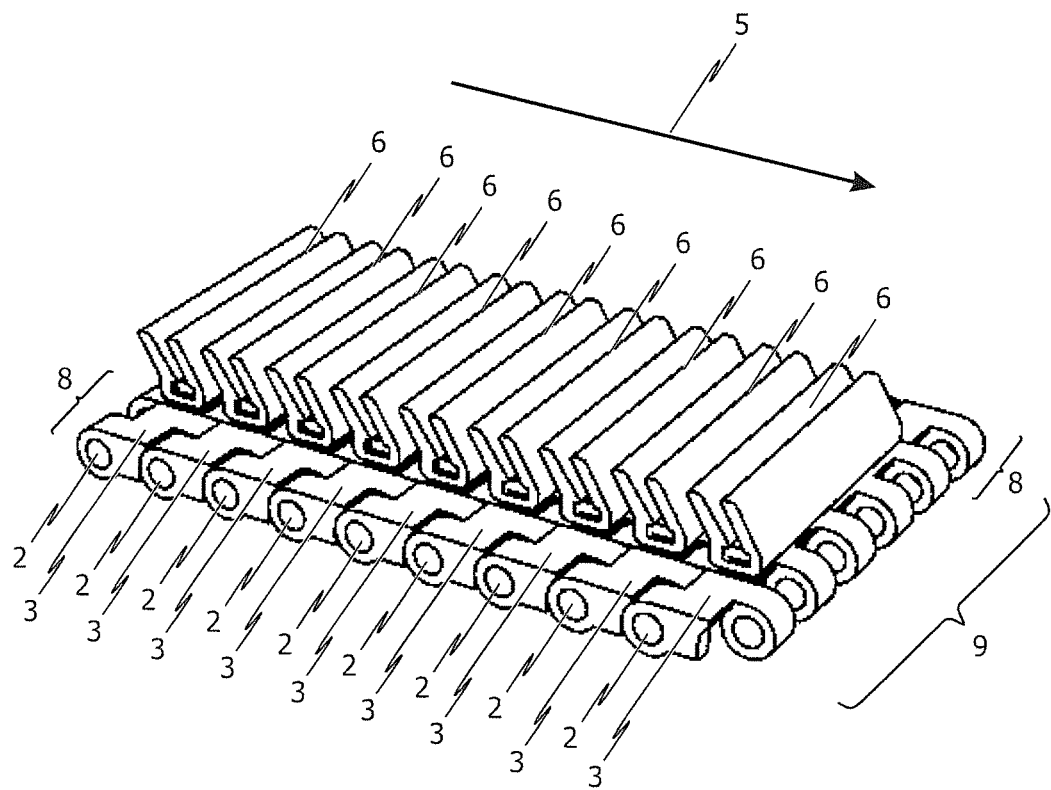
FIG. 2 shows, schematically and in an isometric view, a region of a conveyor chain of an example embodiment of the conveying apparatus according to the invention.

As can be seen from the isometric view of a section of the conveyor chain 1 according to FIG. 2, for example, the conveyor chain 1 comprises a large number of chain links 3 that are connected to one another in an articulated manner around a respective chain link axis 4 via transversely extending chain pins 2. On the other hand, 3 lamellar elements 6 are placed on the chain links, in particular interchangeably.

Figure 6:
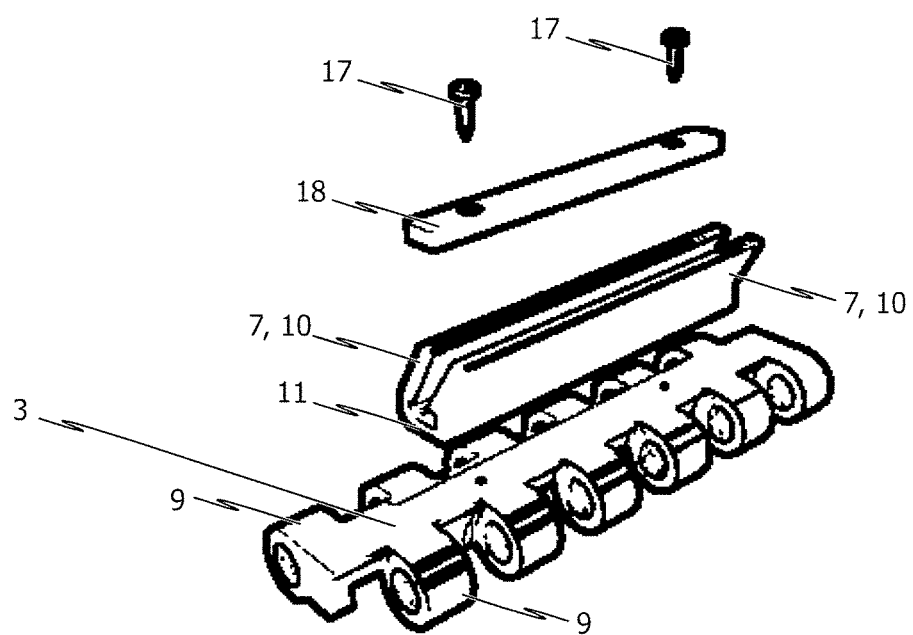
FIG. 6 shows, schematically and in an isometric view, an example embodiment of a chain link with a lamellar element for a conveying apparatus according to the present invention.

As can be seen in the exploded view according to FIG. 6, in the embodiment shown in the drawings, it is provided that exactly one lamellar element 6 is used for each chain link 3. The lamellar element 6 is preferably placed on the chain link 3 in an interchangeable manner, for example with the aid of a screw connection 18 and a pressure plate 18. This ensures that a relative orientation of the lamellar element to the chain link 3 is variably adjustable (at least over a certain range).

More specifically, each chain link 3 comprises a base body, in particular made of plastic, having a respective toothing 9 on two opposite edge regions, wherein said toothings are offset relative to one another and configured to respectively accommodate a complementary toothing 9 of an adjacent chain link 3 in an articulated manner.

In the embodiments shown in the drawings, the lamellar element 6 is configured as a one-piece body, which is preferably made of a rubber material and is substantially U-shaped in cross-section (see, for example, FIG. 3) with a base region 11, via which the lamellar element 6 rests on the corresponding chain link 3, and with two at least substantially parallel leg regions 10 which form the lamellae 7 and in particular extend obliquely with respect to the base region 11.

Figure 3:
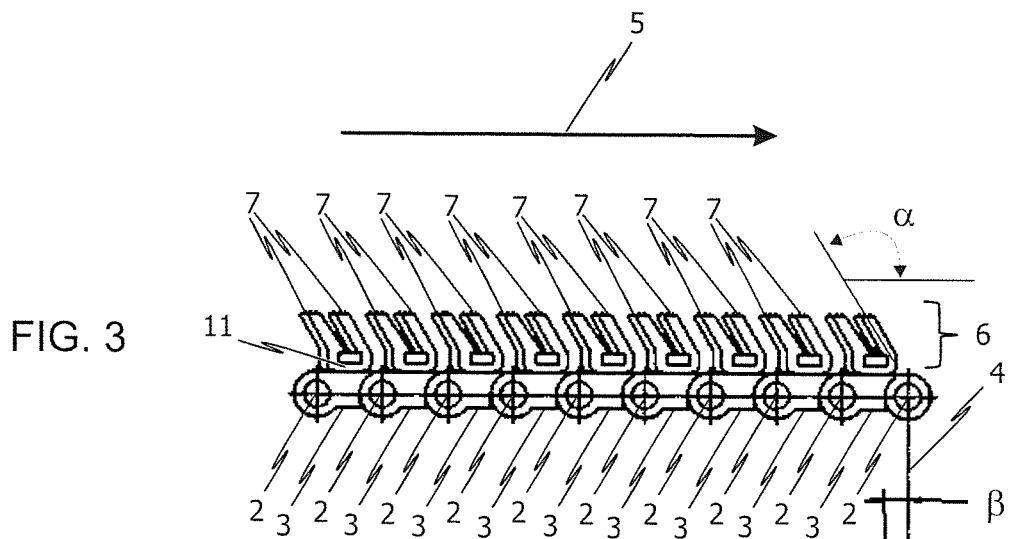
FIG. 3 shows, schematically, and in a side view, the region of the conveyor chain according to FIG. 2.

More specifically, the lamellar elements 6 are placed on the individual chain links 3 such that the respective lamellae 7 of the lamellar elements 6 are oriented obliquely with respect to the chain running direction 5 as can be seen from the side view in FIG. 3, for example.

The lamellae 7 are in particular oriented counter to the chain running direction 5 and are inclined with respect to the chain running direction 5, preferably by an angle α of 100 degrees to 140 degrees and in particular preferably by an angle α of 110 degrees to 130 degrees. The corresponding angle of inclination (angle α) is indicated in FIG. 3.

In the embodiment shown in the drawings, it is further provided that the lamellar elements 6 are placed obliquely on the chain links 3 such that the lamellae 7 are oriented obliquely with respect to the chain link axis 4 and oriented obliquely with respect to the chain running direction 5, i.e., not at a right angle to the chain running direction 5. This is evident from the view (plan view) shown in FIG. 4.

More specifically, the lamellar elements 6 are preferably placed obliquely on the chain links 3 such that an angle β of in particular approximately 1 degree to approximately 5 degrees and preferably in particular approximately 1.5 degrees to approximately 4 degrees is defined between the lamellae 7 and the chain link axis 4. The corresponding angle β is indicated in FIG. 4.

Figure 7A:
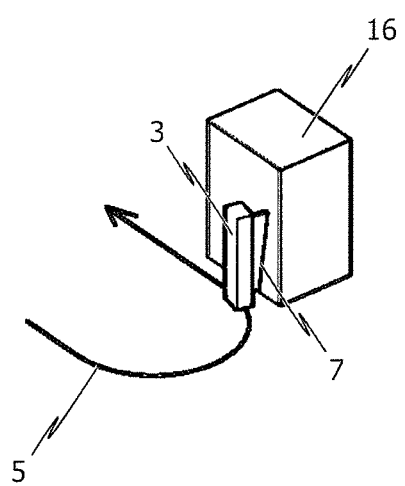
FIG. 7A shows, schematically and in an isometric view, the interaction of a chain link with a lamellar element of a conveyor chain with a product.
Figure 7B:
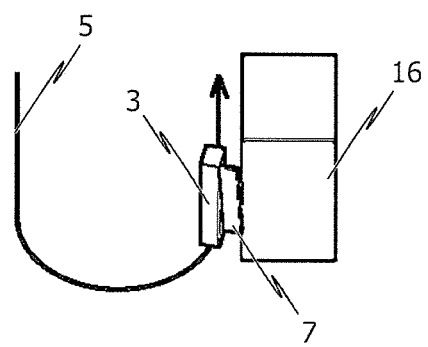
FIG. 7B shows, schematically and in a front view, the product with the chain link and the lamellar element according to FIG. 7A.

As can be seen from the schematic diagrams in FIG. 7A and FIG. 7B, the chain links 3 are in particular oriented vertically when the conveying apparatus is in use. The lamellar elements 6 are placed obliquely on the chain links 3 such that the corresponding lamellae 7 of the lamellar elements 6 are oriented obliquely with respect to the chain link axis 4, specifically such that, when viewed in chain running direction 5, a lower region of each lamella 7 precedes its upper region. This is evident in particular from the front view in FIG. 7B.

Figure 4:
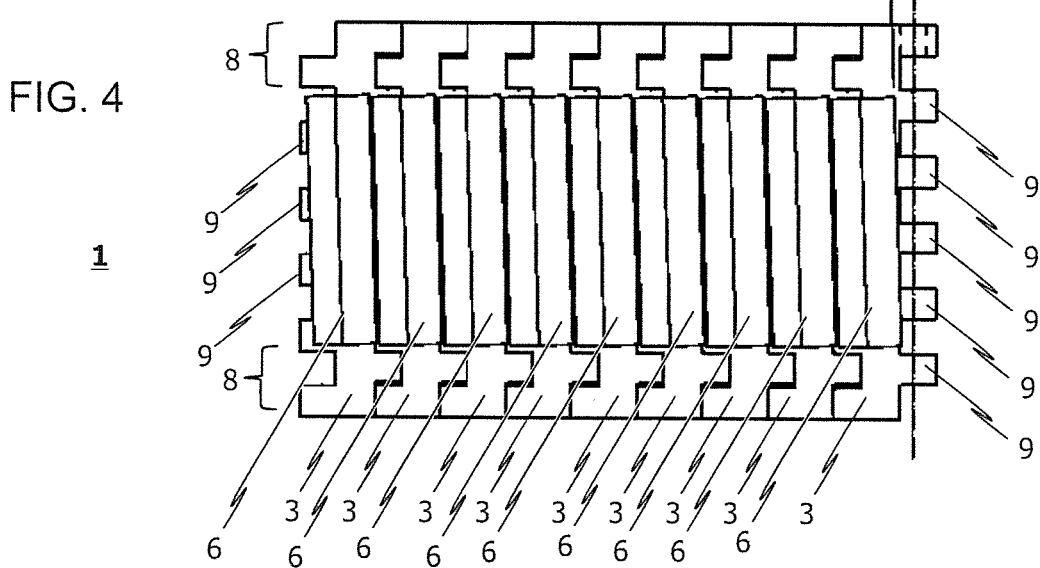
FIG. 4 shows, schematically and in a plan view, the region of the conveyor chain according to FIG. 2.
Figure 5:
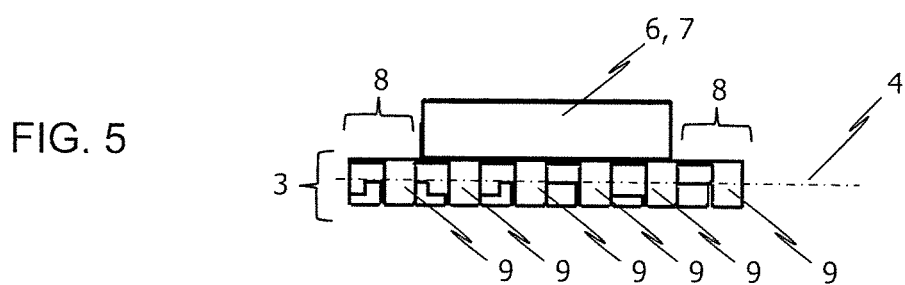
FIG. 5 shows, schematically and in a front view, the region of the conveyor chain according to FIG. 2.

From the plan view in FIG. 4, the isometric view according to FIG. 2 and the isometric view in FIG. 1 it can in particular be seen that, when viewed in longitudinal direction of the lamellar elements 6, the lamellae 7 are configured to be shorter than the chain width specifically such that, when viewed perpendicular to the chain running direction 5, the lateral edge regions 8 of the chain links 3 connected to one another in an articulated manner form two opposite, edge-side conveyor chain regions that serve as a guide, in particular for implementing a deflection of the circulating conveyor chain 1 over the inner radius.

The lamellar elements 6, and in particular the lamellae 7 of the lamellar elements 6, are configured and/or placed on the chain links 3 such that products 16 are subjected to the edge pressure of the individual lamellae 7 in a time-delayed manner when they enter the conveyor chain 1. Deliberately ensuring that the products 16 are not immediately subjected to the full edge pressure of the individual lamellae 7 when they enter the conveyor chain 1, effectively prevents a jerky acceleration of the products 16. The edges of the lamellae 7 instead lie against the product 16 continuously, which enables a significantly more gentle change in speed (acceleration). Likewise, in the event of hold-ups, the products 16 are slowed down more gently as well.

Figure 8:
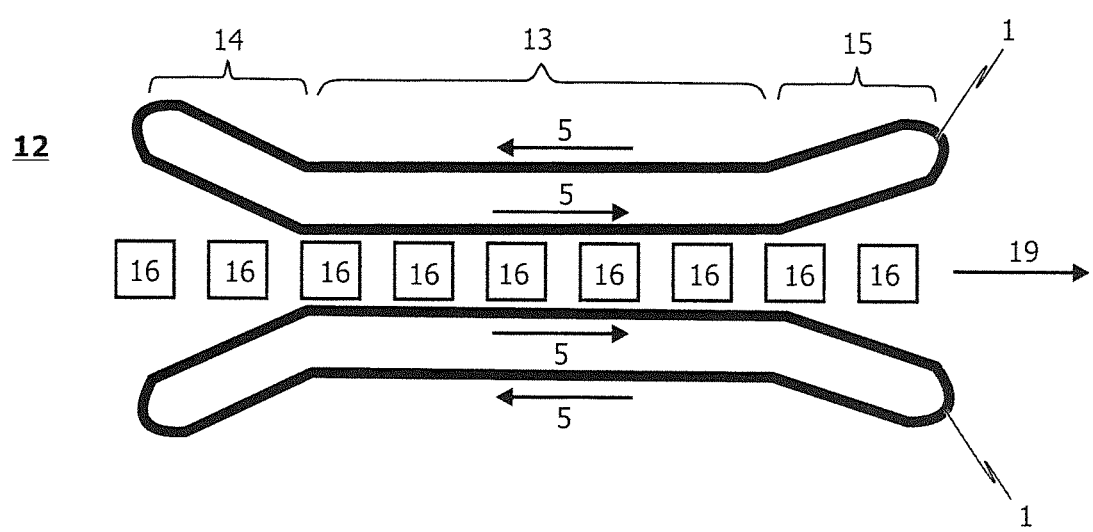
FIG. 8 shows, schematically and in a plan view, a further example embodiment of the transport apparatus according to the invention.

FIG. 8 shows a further embodiment of the transport apparatus 12 according to the invention schematically and in a plan view.

This embodiment comprises a first conveying apparatus of the type according to the invention and a second conveying apparatus of the type according to the invention, whereby the conveyor chain 1 of the first conveying apparatus and the conveyor chain 1 of the second conveying apparatus are each disposed at least substantially vertically and extend at least substantially parallel in a transport region 13 of the transport apparatus 12.

In contrast to the transport apparatus 12 according to FIG. 1, the transport apparatus 12 according to FIG. 8 is characterized in that, when viewed in transport direction 19 of the transport apparatus 12, an infeed area 14 is configured downstream of the transport region 13, in which infeed area the conveyor chain 1 of the first conveying apparatus and the conveyor chain 1 of the second conveying apparatus extend obliquely with respect to the transport direction 19 in the direction of the transport region 13 and thus form a preferably conically tapering infeed funnel.

In the transport apparatus 12 according to FIG. 8 it is furthermore provided that, when viewed in transport direction 19 of the transport apparatus 12, an outfeed area 15 is configured downstream of the transport region 13, in which outfeed area the conveyor chain 1 of the first conveying apparatus and the conveyor chain 1 of the second conveying apparatus extend outward obliquely with respect to the transport direction 19 and thus form a preferably conically widening outfeed funnel. The products 16 can thus be guided with a certain infeed angle in the infeed area 14 and the products 16 can be guided with a corresponding outfeed angle in the outfeed area 15.

By providing such an infeed and outfeed area (14, 15), the products 16 are picked up even more gently by the transport apparatus 12 in the region where the products 16 to be transported are captured or received.

The invention is not limited to the embodiments shown in the drawings, but results when all of the features disclosed herein are considered together.

The invention claimed is:

1. A conveying apparatus in or for a packaging machine having at least one conveyor chain (1) which circulates in a chain running direction (5) comprising: a plurality of chain links (3) that are connected to one another in an articulated manner around a respective chain link axis (4) via transversely extending chain pins (2), wherein lamellar elements (6) are placed on the chain links (3) interchangeably, each of the lamellar elements (6) comprising lamellae (7) made of a spring-elastic material, extending outward from the chain links (3), oriented obliquely with respect to the chain links (3) and the chain link axis (4), and oriented obliquely with respect to the chain running direction (5).

2. The conveying apparatus according to claim 1, wherein each of the lamellar elements (6) comprises a base (11) that rests on the chain links (3) and the lamellae (7) are connected to the base (11) via a spring-elastic region placed on the chain links (3).

3. The conveying apparatus according to claim 1, wherein the lamellae (7) are oriented counter to the chain running direction (5) and are inclined with respect to the chain running direction (5), by an angle α of 100 degrees to 140 degrees and in particular by an angle α of 110 degrees to 130 degrees.

4. The conveying apparatus according to claim 1, wherein the lamellar elements (6) are placed obliquely on the chain links (3) such that an angle β of approximately 1 degree to approximately 5 degrees is defined between the lamellae (7) and the chain link axis (4).

5. The conveying apparatus according to claim 1, wherein the chain links (3) are oriented vertically, and wherein the lamellar elements (6) are placed obliquely on the chain links (3) such that the lamellae (7) are oriented obliquely with respect to the chain link axis (4), specifically such that, when viewed in chain running direction (5), a lower region of each lamella (7) precedes its upper region.

6. The conveying apparatus according to claim 1, wherein, when viewed in longitudinal direction of the lamellar elements (6), the lamellae (7) are configured to be shorter than the chain width such that, when viewed perpendicular to the chain running direction (5), lateral edge regions of the chain links (3) connected to one another in an articulated manner form two opposite, edge-side conveyor chain regions (8) that serve as a guide, in particular for implementing a deflection of the circulating conveyor chain (1) over the inner radius.

7. The conveying apparatus according to claim 1, wherein the chain links (3) each comprise a base body, made of plastic, having a respective toothing (9) on two opposite edge regions, wherein said toothings are offset relative to one another and configured to respectively accommodate a complementary toothing (9) of an adjacent chain link (3) in an articulated manner.

8. The conveying apparatus according to claim 1, wherein the lamellar element (6) is configured as a preferably one-piece body, made of a rubber material, and is substantially U-shaped in cross-section with a base region (11), via which the lamellar element (6) rests on the corresponding chain link (3), and with two at least substantially parallel leg regions (10) which form the lamellae (7) and extend obliquely with respect to the base region (11).

9. The conveying apparatus according to claim 1, wherein the lamellar element (6) is connected to the chain link (3), preferably in a detachable and/or interchangeable manner, via a form- and/or force-locking connection, in particular with the aid of a screw, latching and/or clip connection (17).

10. The conveying apparatus according to claim 1, wherein the lamellar elements (6), and in particular the lamellae (7) of the lamellar elements (6), are configured and/or placed on the chain links (3) such that products (16) are subjected to the edge pressure of the individual lamellae (7) in a time-delayed manner when they enter the conveyor chain (1).

11. The conveying apparatus according to claim 1, wherein the orientation of the lamellae (7) relative to the chain running direction (5) and/or relative to the chain link axis (4) is preferably variably adjustable at least over a previously defined or definable range.

12. A buffer table for a packaging installation, wherein the buffer table comprises:
at least one infeed section;
at least one outfeed section; and
at least one buffer line which can be loaded with packs (16) and is disposed between the at least one infeed section and the at least one outfeed section, wherein a transport apparatus is assigned to the at least one buffer line for transporting the respective packs (16),
wherein the transport apparatus comprises:
a first conveying apparatus and a second conveying apparatus, each including:
at least one conveyor chain (1) which circulates in a chain running direction (5) and including a plurality of chain links (3) that are connected to one another in an articulated manner around a respective chain link axis (4) via transversely extending chain pins (2), and
lamellar elements (6) comprising lamellae (7) made of a spring-elastic material and oriented obliquely with respect to the chain running direction (5) and placed on the chain links (3) interchangeably;
wherein the conveyor chain (1) of the first conveying apparatus and the conveyor chain (1) of the second conveying apparatus are each disposed at least substantially vertically and extend at least substantially parallel to one another at least in one region of the at least one buffer line,
wherein, at least in the region of the at least one buffer line, the lamellae (7) of the conveyor chain (1) of the first conveying apparatus and the lamellae (7) of the conveyor chain (1) of the second conveying apparatus are each oriented obliquely with respect to the chain running direction (5), specifically such that, when viewed in chain running direction (5), a lower region of each lamella (7) precedes its upper region, in particular such that a clamping force exerted onto the products (16) by the lamellae (7) of the two conveyor chains (1) is preferably increased as a function of a force effect which acts in chain running direction (5) and in a relative manner between the lamellae (7) and the products (16).

13. A transport apparatus (12) for transporting products (16), in particular pressure-sensitive products (16), such as soft packaging, in a transport direction (19), wherein the transport apparatus (12) comprises:
a first conveying apparatus and a second conveying apparatus, each including:
at least one conveyor chain (1) which circulates in a chain running direction (5) and including a plurality of chain links (3) that are connected to one another in an articulated manner around a respective chain link axis (4) via transversely extending chain pins (2), and lamellar elements (6) comprising lamellae (7) made of a spring-elastic material and oriented obliquely with respect to the chain running direction (5) and placed on the chain links (3) interchangeably;

wherein the conveyor chain (1) of the first conveying apparatus and the conveyor chain (1) of the second conveying apparatus are each disposed at least substantially vertically and extend at least substantially parallel to one another in a transport region (13) of the transport apparatus (12).

14. The transport apparatus (12) according to claim 13, wherein, when viewed in transport direction (19) of the transport apparatus (12), an infeed area (14) is configured upstream of the transport region (13), in which infeed area the conveyor chain (1) of the first conveying apparatus and the conveyor chain (1) of the second conveying apparatus extend obliquely with respect to the transport direction (19) in the direction of the transport region (13) and form a preferably conically tapering infeed funnel;

wherein, when viewed in transport direction (19) of the transport apparatus (12), an outfeed area (15) is configured downstream of the transport region (13), in which outfeed area the conveyor chain (1) of the first conveying apparatus and the conveyor chain (1) of the second conveying apparatus extend outward obliquely with respect to the transport direction (19) and form a conically widening outfeed funnel.

15. A packaging machine comprising at least one and preferably at least two packaging installations and a buffer table according to claim 12 for temporarily storing products as needed and/or comprising a transport apparatus (12) for delivering and/or removing products (16) to and/or from the at least one packaging installation.

16. The conveying apparatus according to claim 1, wherein each of the plurality of chain links (3) includes one of the lamellar elements (6).

17. The conveying apparatus according to claim 1, wherein the lamellar elements (6) are disposed on a side of the at least one conveyor chain (1) facing products (16) to be conveyed.

18. A buffer table for a packaging installation, wherein the buffer table comprises:
at least one infeed section;
at least one outfeed section; and
at least one buffer line which can be loaded with packs (16) and is disposed between the at least one infeed section and the at least one outfeed section, wherein a transport apparatus is assigned to the at least one buffer line for transporting the respective packs (16), wherein the transport apparatus comprises:
a first conveying apparatus according to claim 1; and
a second conveying apparatus according to claim 1,
wherein the conveyor chain (1) of the first conveying apparatus and the conveyor chain (1) of the second conveying apparatus are each disposed at least substantially vertically and extend at least substantially parallel to one another at least in one region of the at least one buffer line, wherein, at least in the region of the at least one buffer line, the lamellae (7) of the conveyor chain (1) of the first conveying apparatus and the lamellae (7) of the conveyor chain (1) of the second conveying apparatus are each oriented obliquely with respect to the chain running direction (5), specifically such that, when viewed in chain running direction (5), a lower region of each lamella (7) precedes its upper region, in particular such that a clamping force exerted onto the products (16) by the lamellae (7) of the two conveyor chains (1) is preferably increased as a function of a force effect which acts in chain running direction (5) and in a relative manner between the lamellae (7) and the products (16).

19. A transport apparatus (12) for transporting products (16), in particular pressure-sensitive products (16), such as soft packaging, in a transport direction (19), wherein the transport apparatus (12) comprises:
a first conveying apparatus according to claim 1; and
a second conveying apparatus according to claim 1,
wherein the conveyor chain (1) of the first conveying apparatus and the conveyor chain (1) of the second conveying apparatus are each disposed at least substantially vertically and extend at least substantially parallel to one another in a transport region (13) of the transport apparatus (12).

20. The conveying apparatus according to claim 4, wherein the lamellar elements (6) are placed obliquely on the chain links (3) such that the angle $\beta$ is approximately 1.5 degrees to approximately 4 degrees between the lamellae (7) and the chain link axis (4).

* * * * *